(12) United States Patent
Swanson et al.

(10) Patent No.: US 10,935,630 B2
(45) Date of Patent: Mar. 2, 2021

(54) METHOD FOR THREE-DIMENSIONAL TRACKING OF SINUSOIDAL ACOUSTIC SOURCE USING A ROTATING MICROPHONE

(71) Applicant: The United States of America as represented by the Secretary of the Navy

(72) Inventors: Paul D. Swanson, San Diego, CA (US); Stephen L. Hobbs, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 452 days.

(21) Appl. No.: 16/113,691

(22) Filed: Aug. 27, 2018

(65) Prior Publication Data

US 2020/0064438 A1 Feb. 27, 2020

(51) Int. Cl.
*G01S 5/20* (2006.01)
*G01S 3/802* (2006.01)
*G08G 5/00* (2006.01)
*G08G 5/04* (2006.01)

(52) U.S. Cl.
CPC .............. *G01S 5/20* (2013.01); *G01S 3/8022* (2013.01); *G08G 5/0078* (2013.01); *G08G 5/04* (2013.01)

(58) Field of Classification Search
CPC ....... G01S 5/20; G01S 3/8022; G08G 5/0078; G08G 5/04
See application file for complete search history.

(56) References Cited

U.S. PATENT DOCUMENTS

| 2,397,746 | A | * | 4/1946 | Lewis | ................... G01S 3/8083 367/127 |
| 3,281,764 | A | * | 10/1966 | Tatom | ..................... G01S 15/42 367/101 |
| 5,361,072 | A | | 11/1994 | Barrick et al. | |
| 2020/0064438 | A1 | * | 2/2020 | Swanson | ............... G01S 3/8022 |

* cited by examiner

*Primary Examiner* — Daniel Pihulic
(74) *Attorney, Agent, or Firm* — Naval Information Warfare Center, Pacific; Kyle Eppcie; Young Fei

(57) ABSTRACT

A method for determining the location of a first source. A first member is provided. A first tip microphone is attached to a first end of the first member. A first static microphone is provided. An initial frequency is recorded at the static microphone. The first member is rotated at an angular velocity. A tangential distance is calculated from the first tip microphone to the source. A source angle is calculated from the first member to the source. A height of the source is calculated.

20 Claims, 19 Drawing Sheets

METHOD FOR THREE-DIMENSIONAL TRACKING OF SINUSOIDAL ACOUSTIC SOURCE USING A ROTATING MICROPHONE

FEDERALLY SPONSORED RESEARCH AND DEVELOPMENT

The Method for Three-Dimensional Tracking of Sinusoidal Acoustic Source Using a Rotating Microphone is assigned to the United States Government and is available for licensing and commercial purposes. Licensing and technical inquiries may be directed to the Office of Research and Technical Applications, Space and Naval Warfare Systems Center Pacific (Code 72120), 53560 Hull Street, San Diego, Calif. 92152, via telephone at (619) 553-2778, or email at ssc_pac_t2@navy.mil. Reference Navy Case 105823 in all communications.

BACKGROUND OF THE INVENTION

Small unmanned aerial vehicles (UAVs) do not have the weight capacity to employ radar-based collision avoidance systems while still performing their original function. Ground-based UAV tracking systems have difficulty tracking the location of all UAVs in a dense swarm. A fixed array of microphones similarly requires a significant footprint. Passive radar tracking is only feasible in scenarios where the tracked UAV emits a radio-frequency (RF) signal. Active radar employed on-board a large number of UAVs would result in interference where the UAVs would jam one another. The inventive method utilizes pre-existing propellers on UAVs as well as Doppler-based acoustic tracking.

SUMMARY OF THE INVENTION

The present invention is a method for determining the location of a first source. A first member is provided. A first tip microphone is attached to a first end of the first member. A first static microphone is provided. An initial frequency is recorded at the static microphone. The first member is rotated at an angular velocity. A tangential distance is calculated from the first tip microphone to the source. A source angle is calculated from the first member to the source. A height of the source is calculated.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

While this invention may be embodied in different forms, the drawings and this section describe in detail specific embodiments of the invention with the understanding that the present disclosure is to be considered merely a preferred embodiment of the invention, and is not intended to limit the invention in any way.

Figure 3:
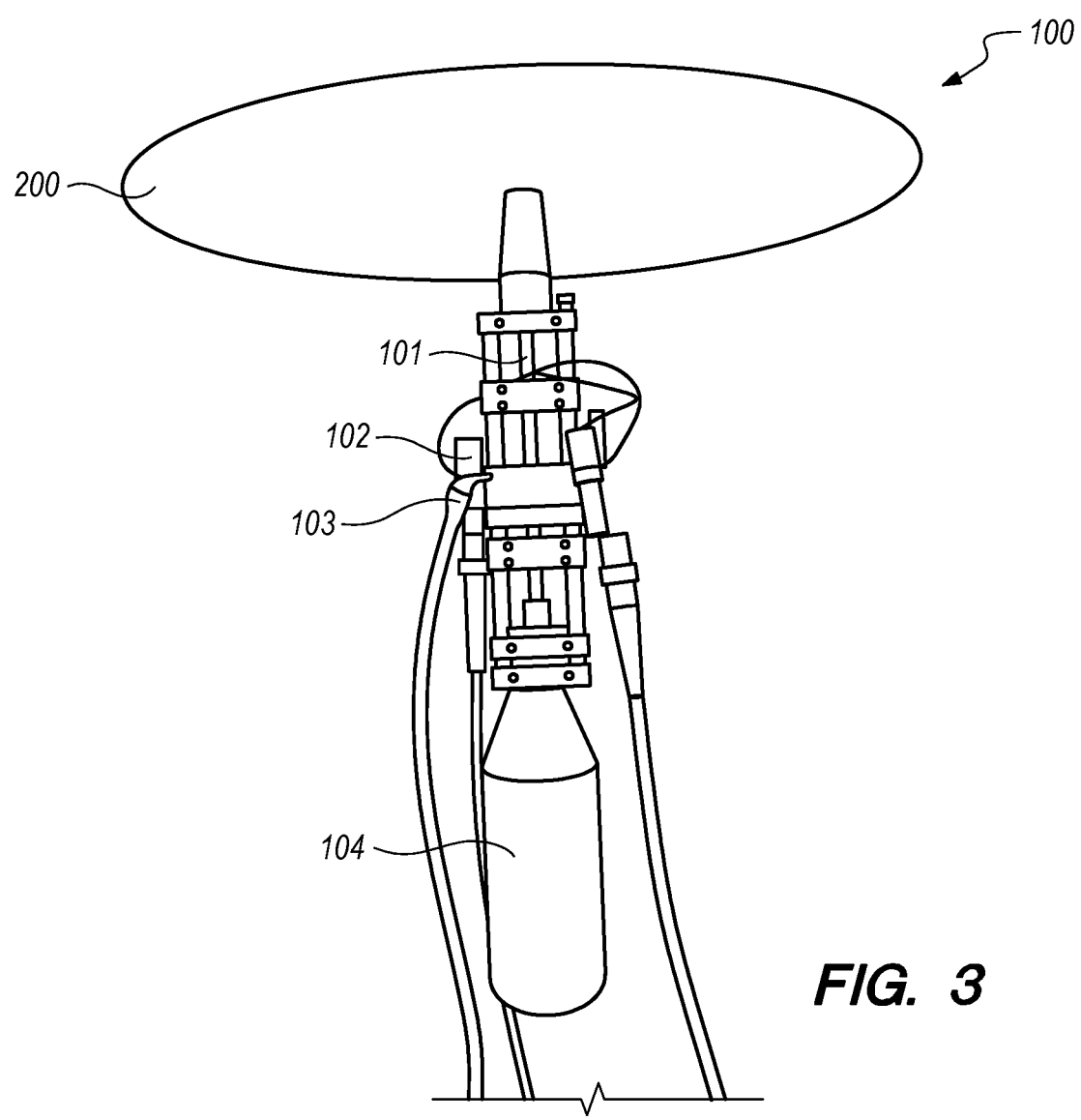
FIG. 3 is a perspective view of an embodiment of the present invention.

The present invention is a method 10 which uses the receiver motion based acoustic Doppler shifts measured at a first tip microphone 202 to determine the location of acoustic sinusoidal sources. This method 10 may be used to provide a method for unmanned aerial vehicles (UAVs) to track the location in three dimensions of nearby drones. This capability will assist in UAV navigation, UAV collision avoidance, and counter-UAV systems. FIG. 3 depicts components which may be used to practice the method 10. A first tip microphone 202 is attached to the blade tip of a first member 201. The angle of rotation θ is measured at the rotary encoder 103 for each angle of rotation of the propeller unit 200. As the propeller unit 200 rotates, a sound is measured at the first tip microphone 202, resulting in a measured frequency $f_m$ correlating with that angle of rotation θ. A slip ring 101 permits the signal to be transmitted from the first tip microphone 202 to a processor. A static microphone 102 measures and records an initial frequency $f_0$. Alternatively, $f_0$ could be measured at the first tip microphone 202, where the frequency halfway between the maximum measured frequency and minimum measured frequency is $f_0$. A variable high speed motor 104 rotates the propeller unit 200 at an angular velocity ω. The static microphone 102 and the first tip microphone 202 may be microelectromechanical systems (MEMS) microphone, and the rotary encoder 103 may have a resolution of 0.125 degrees.

Figure 4:
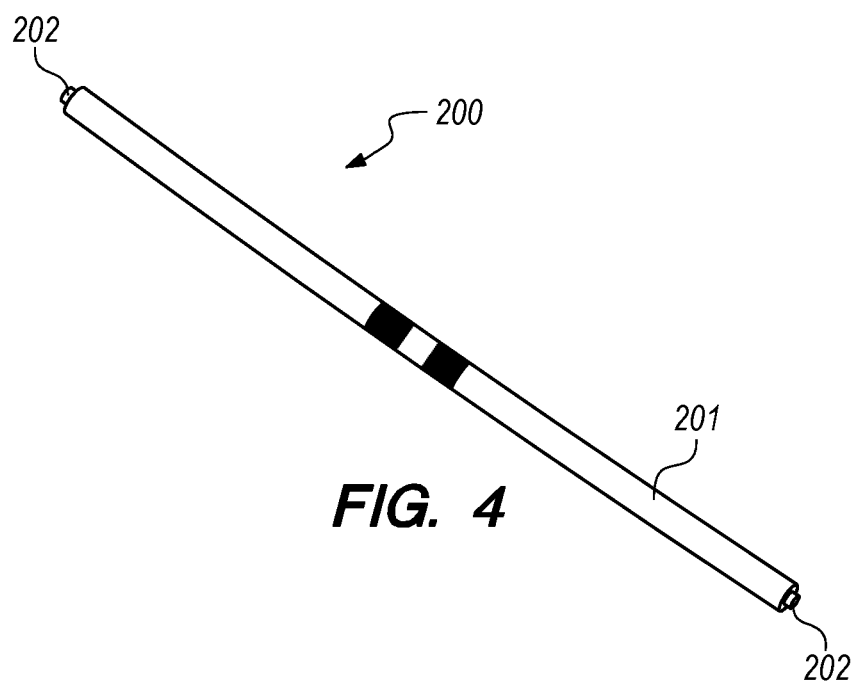
FIG. 4 is a perspective view of a propeller unit according to one embodiment of the present invention.
Figure 5:
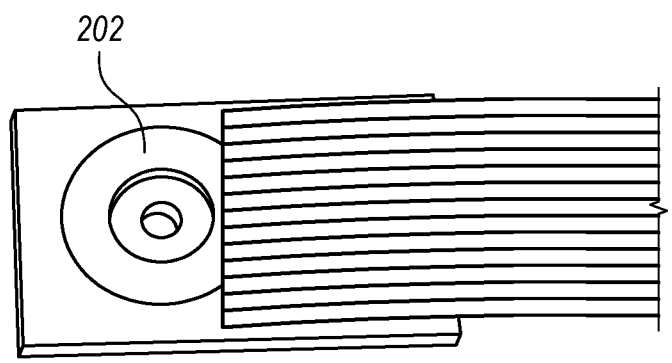
FIG. 5 is a perspective view of a rotating microphone according to one embodiment of the present invention.
Figure 6:
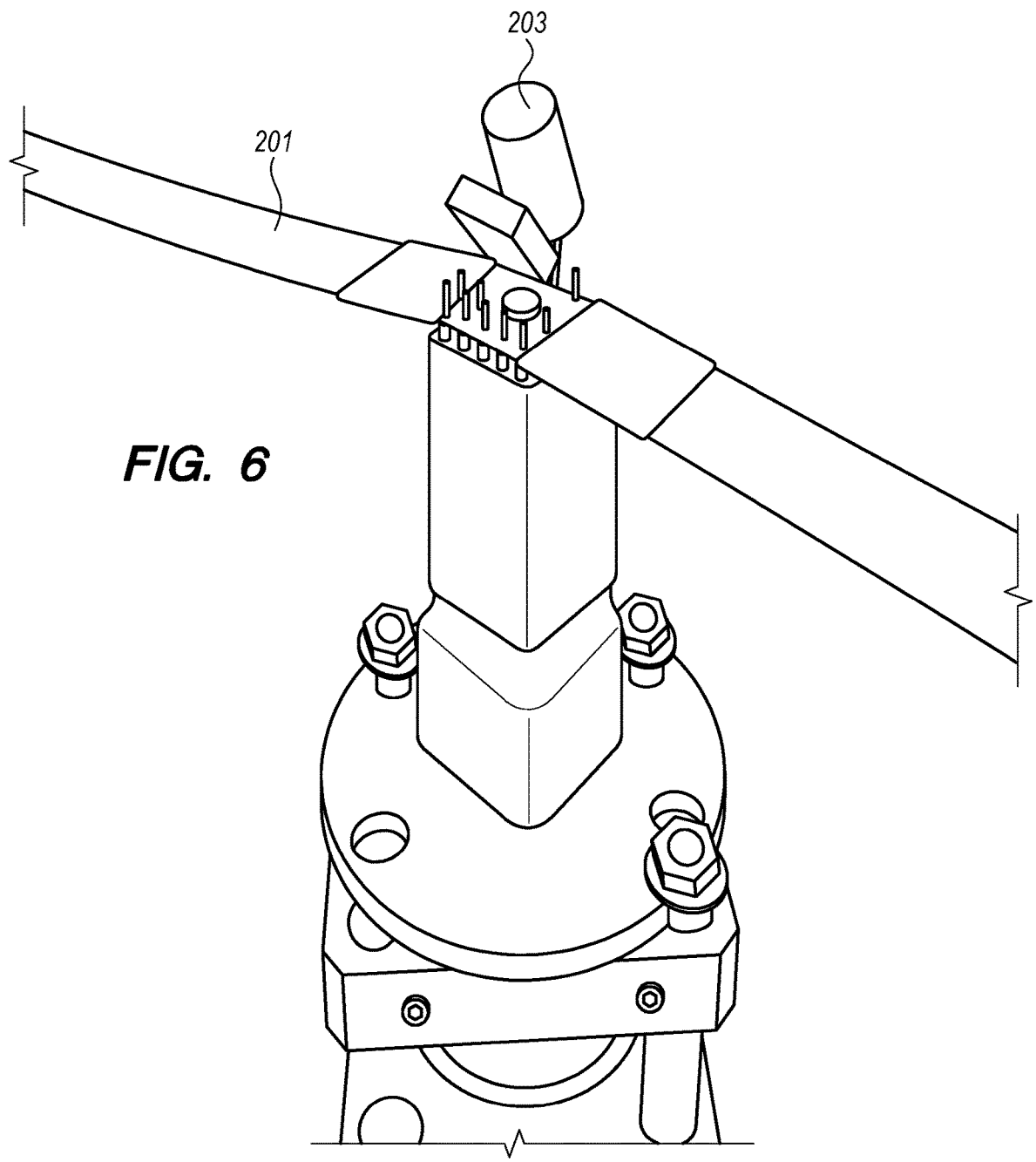
FIG. 6 is a perspective view of a capacitor according to one embodiment of the present invention.

FIG. 4 depicts the propeller unit 200 in greater detail. The first member 201 has an overall length l, and the first tip microphone 202 is mounted at the end of the first member 201. FIG. 5 depicts the first tip microphone 202 in greater detail. FIG. 6 depicts a capacitor 203 attached to the propeller unit 200. This capacitor 203 is used to eliminate the noise caused by the slip ring 101 on the line powering the MEMS microphones output operational amplifier (op-amp).

Figure 1:
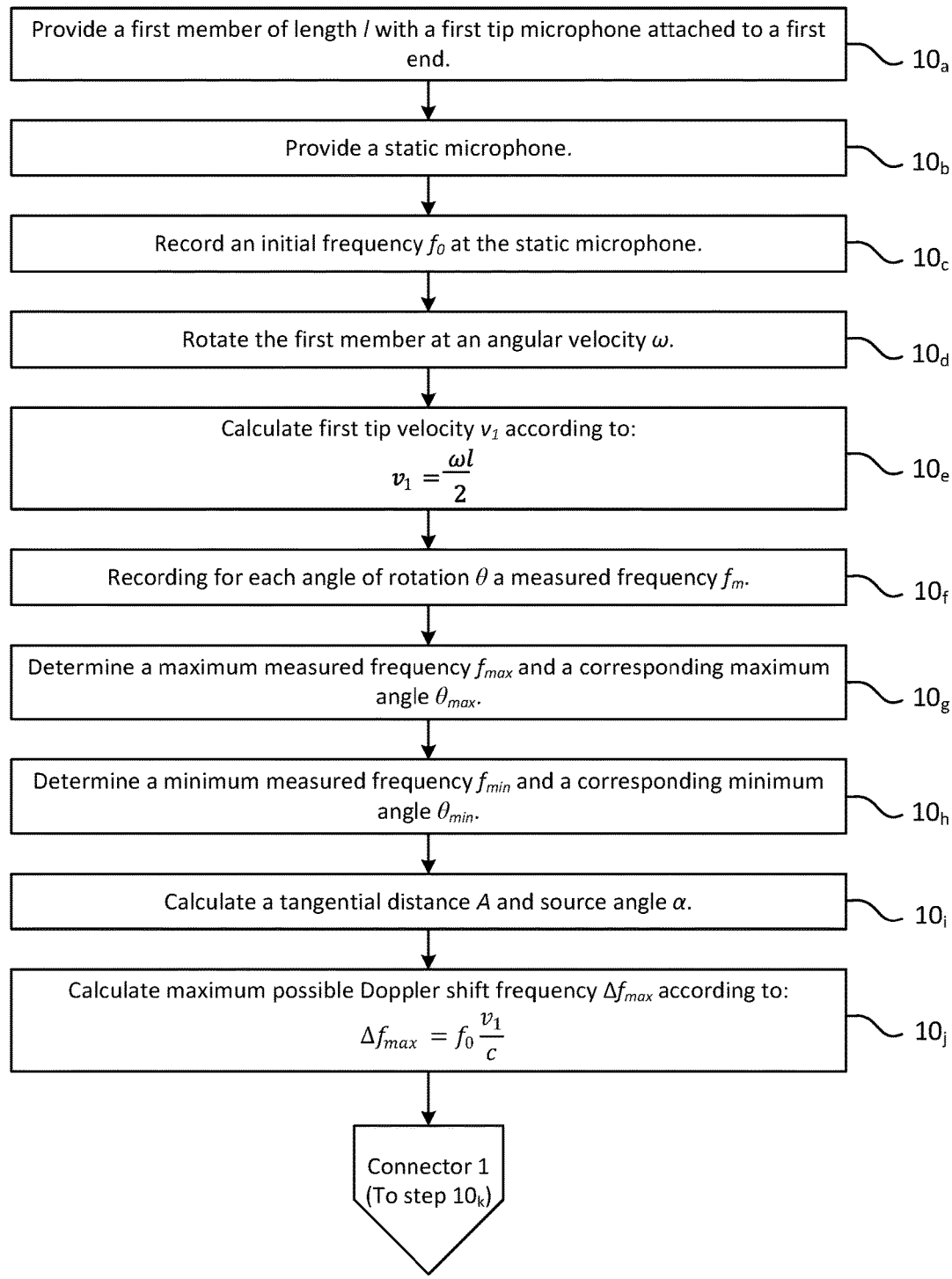
FIG. 1 is a flowchart of a method for determining the location of a source, in accordance with one embodiment of the present invention.
Figure 2:
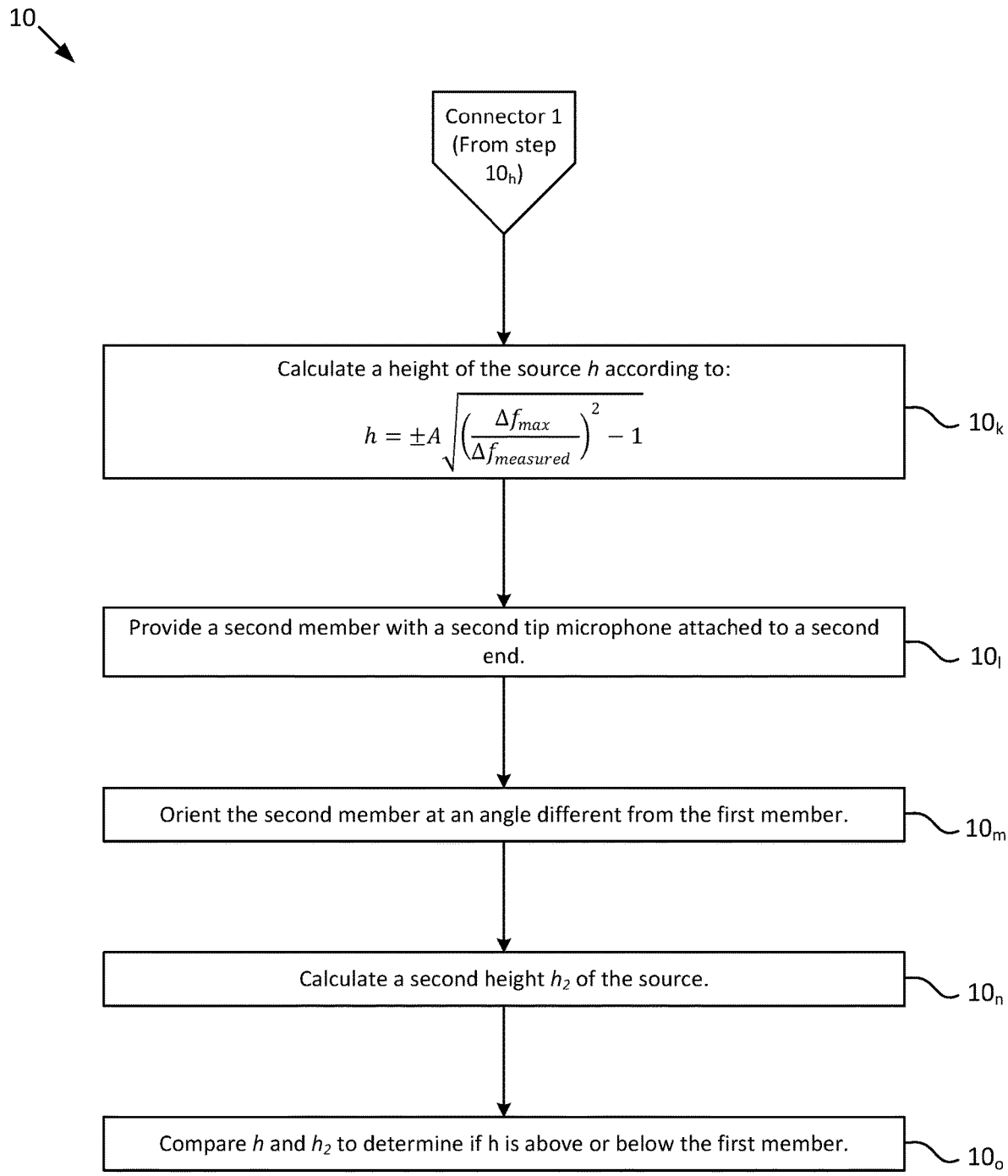
FIG. 2 is a flowchart depicting a method in accordance with one embodiment of the present invention.

FIG. 1 depicts a method 10 according to an embodiment of the present invention. A first member 201 of length l with a first tip microphone 202 is attached to a first end. Step 10a. A static microphone 102 is provided. Step 10b. An initial frequency $f_0$ is recorded at the static microphone 102. Step 10c. The first member 201 is rotated at an angular velocity ω. Step 10d. A first tip velocity $v_1$ is calculated according to equation 1 below:

$$v_1 = \frac{\omega l}{2}. \tag{1}$$

For each angle of rotation θ of the propeller unit 200, its correlated measured frequency $f_m$ is recorded at the first tip microphone 202. Step 10f. From the recorded measured frequencies, a maximum measured frequency $f_{max}$ and a corresponding maximum angle $θ_{max}$ is determined and recorded. Step 10g. Additionally, a minimum measured frequency $f_{min}$ and a corresponding minimum angle $θ_{min}$ is determined and recorded. Step 10h.

Figure 7:
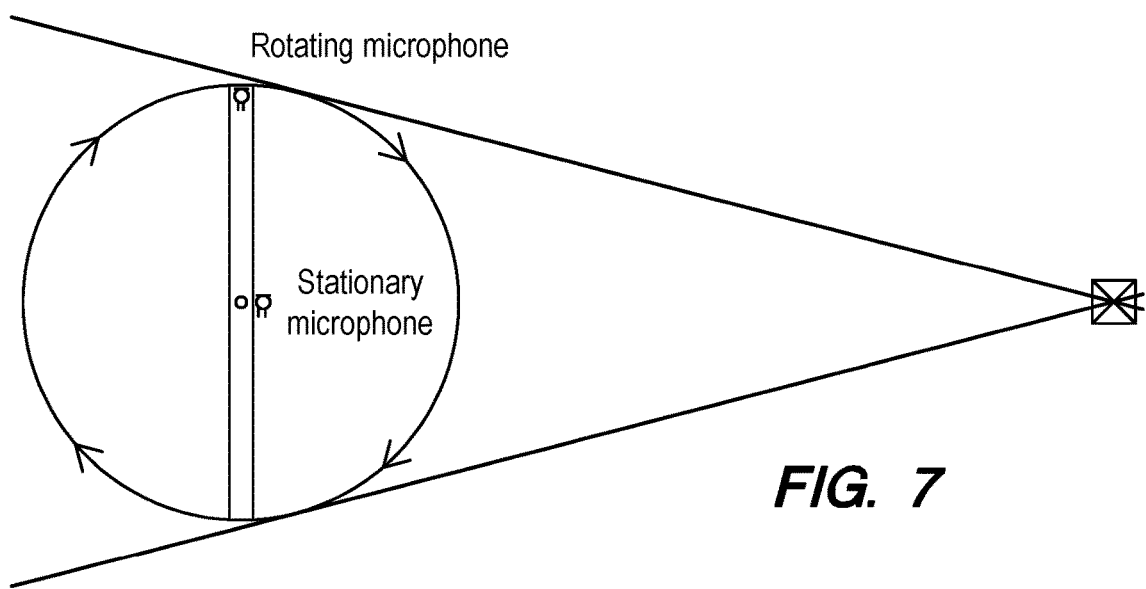
FIG. 7 depicts the relationship between various units and measurements used in an embodiment of the present invention.
Figure 8:
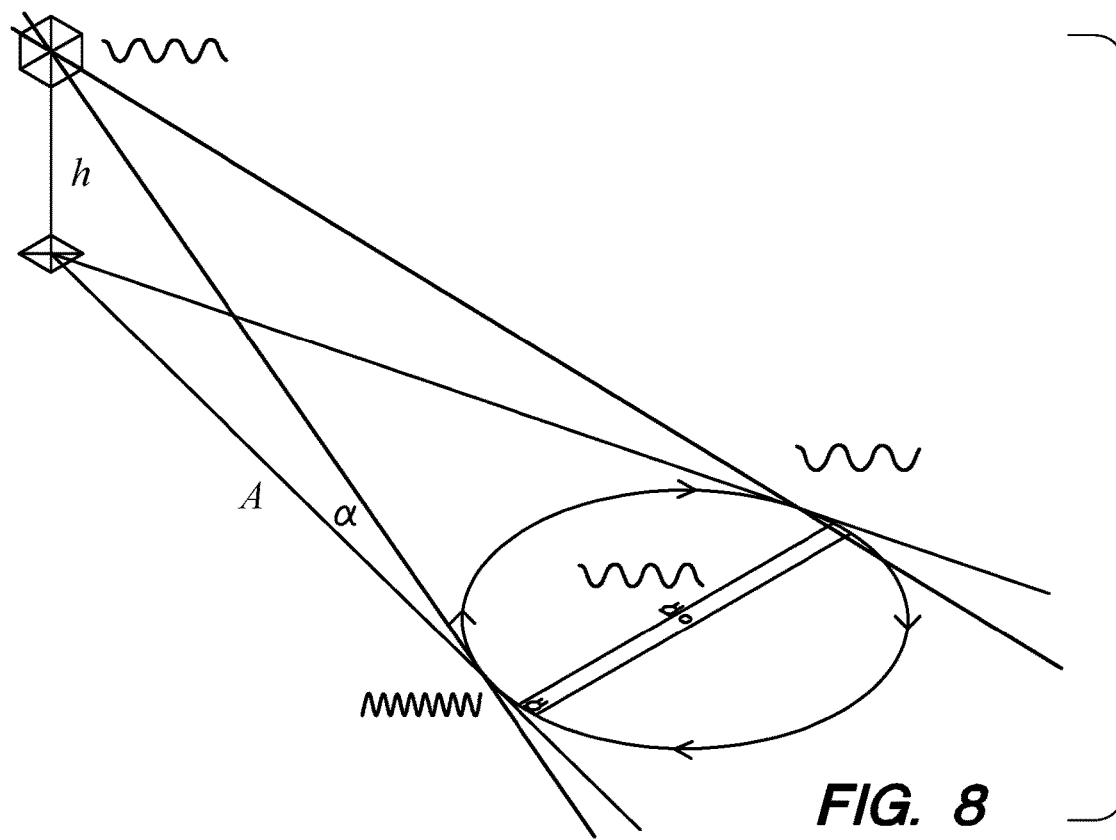
FIG. 8 depicts the relationship between various units and measurements used in an embodiment of the present invention.

The measured frequency $f_m$ from a sinusoidal acoustic source would experience a maximum Doppler shift when the tip of the first member 201 is tangent to the direct line from the first tip microphone 202 to the acoustic source, projected onto the plane of the first member's 201 rotation, depicted in FIG. 7. Similarly, the measured frequency Doppler shift would decrease as the source is raised or lowered from the plane of the propeller. FIG. 8. The maximum possible Doppler shift frequency $Δf_{max}$ can be calculated where the initial frequency $f_0$ of the acoustic sine wave without the presence of the Doppler shift caused by the rotating propeller, the first tip velocity $v_1$, and the speed of sound c are known according to equation 2 below:

$$Δf_{max} = f_0 \frac{v_1}{c}. \tag{2}$$

Knowing this relationship, the Doppler shift of the measured frequency $Δf_m$ can be expressed as a function of the initial frequency $f_0$, the speed of sound c, as well as the unit vector n in the direction from the acoustic source towards the first tip microphone 202, as well as the velocity vector of the rotating microphone $\vec{v_1}$ according to equation 3 below:

$$Δf_m = f_0 \frac{n \cdot \vec{v_1}}{c}. \tag{3}$$

Figure 9:
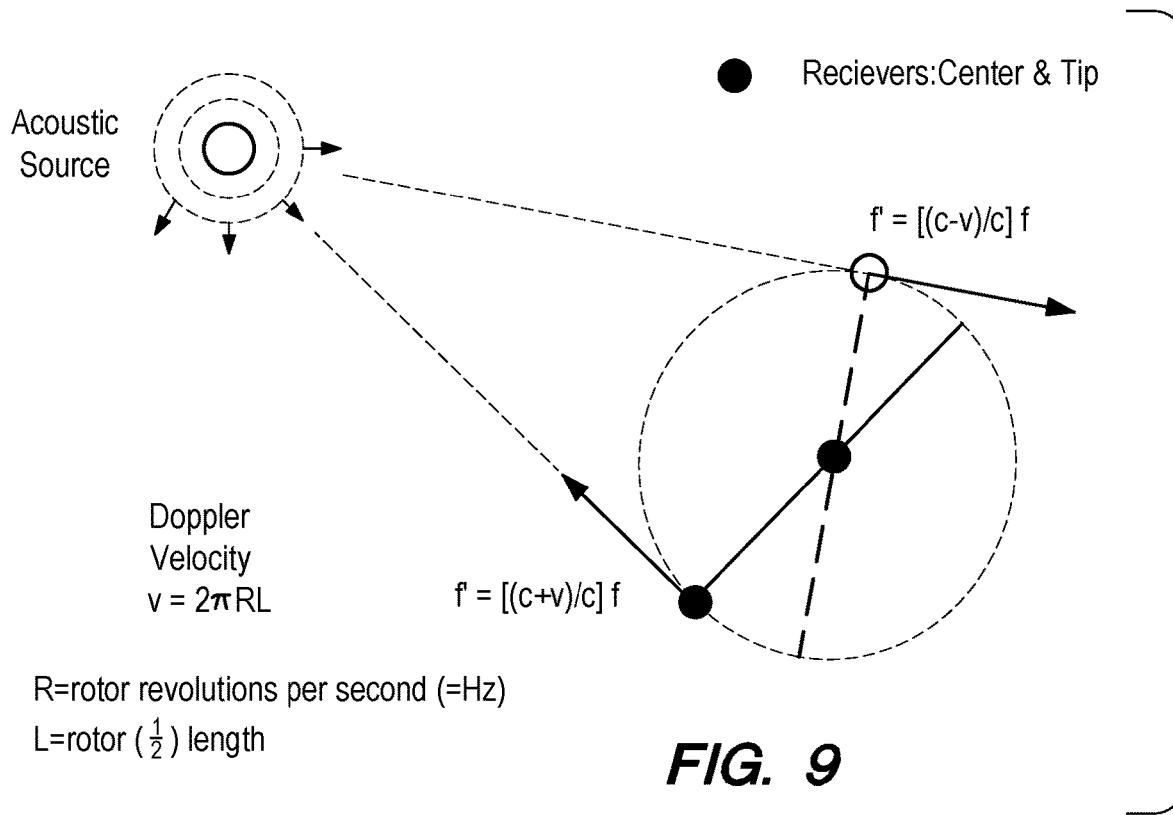
FIG. 9 depicts the relationship between various units and measurements used in an embodiment of the present invention.

The height of the acoustic source above or below the plane of the spinning first member 201 is then calculated according to the tangential distance A at Step 10k. The tangential distance A and source angle α are calculated according to conventional methods from the known maximum measured frequency $f_{max}$, corresponding maximum angle $θ_{max}$, minimum measured frequency $f_{min}$, and corresponding minimum angle $θ_{min}$ at Step 10j. See FIG. 9. The height h of the source above or below the plane of the spinning first member 201 can be calculated according to equation 4 below:

$$h = \pm A \sqrt{\left(\frac{Δf_{max}}{Δf_{measured}}\right)^2 - 1}. \tag{4}$$

Figure 10:
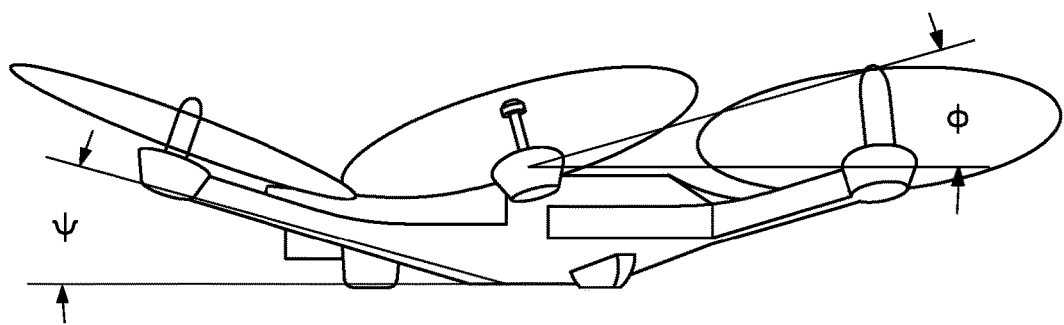
FIG. 10 depicts an embodiment of the present invention where the propeller blades rotate in different planes.

Using multiple propellers mounted at different angles would provide enough signal information to determine if the acoustic source is above or below the plane of the propellers. One such embodiment is depicted in FIG. 10. In such an embodiment, a second member with a second tip microphone attached to a second end is provided. Step 10l. The second member is orientated at an angle different from the first member (in a different plane of rotation). Step 10m. A second height $h_2$ can be calculated using the same technique as described above for h. Step 10n. After $h_2$ is calculated, h and $h_2$ can be compared to determine if h is above or below the first member 201. Step 10o.

Figure 11:
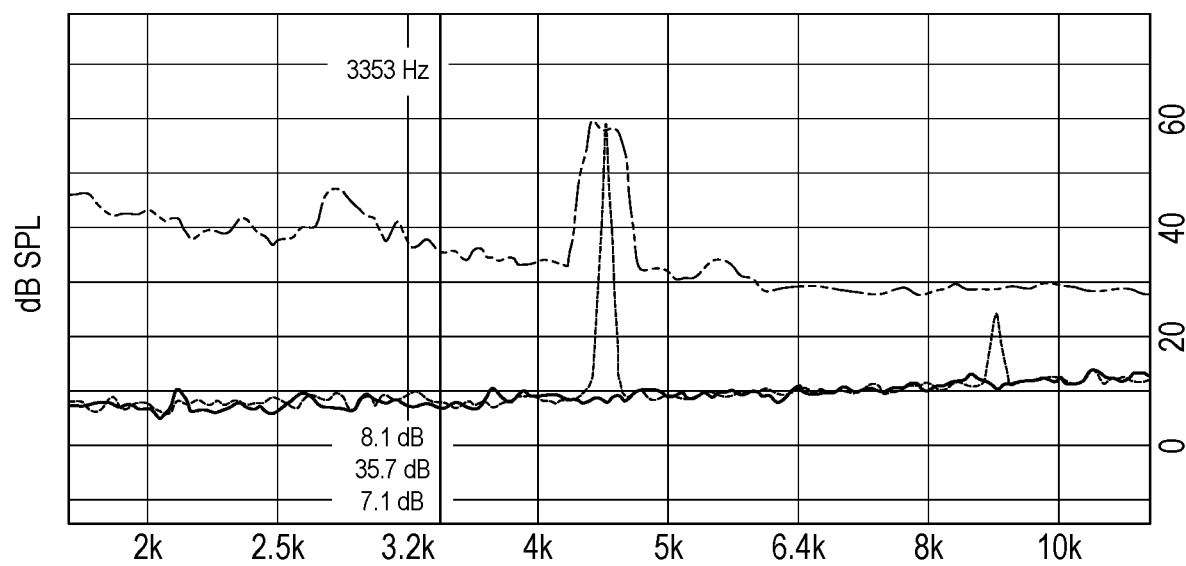
FIG. 11 depicts a Fourier transform of a sinusoidal acoustic source according to one embodiment of the present invention.
Figure 12A:
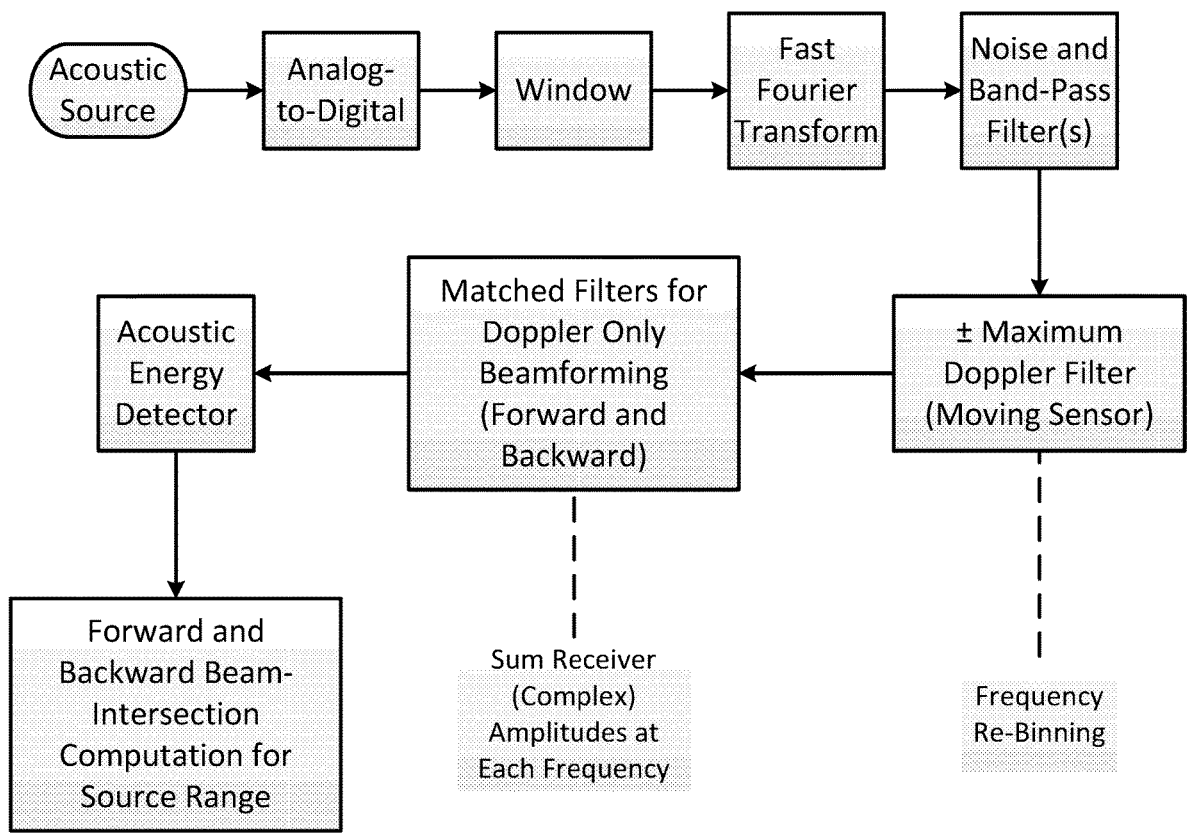
FIG. 12A is a flowchart depicting a signal processing path for a single acoustic source.
Figure 12B:
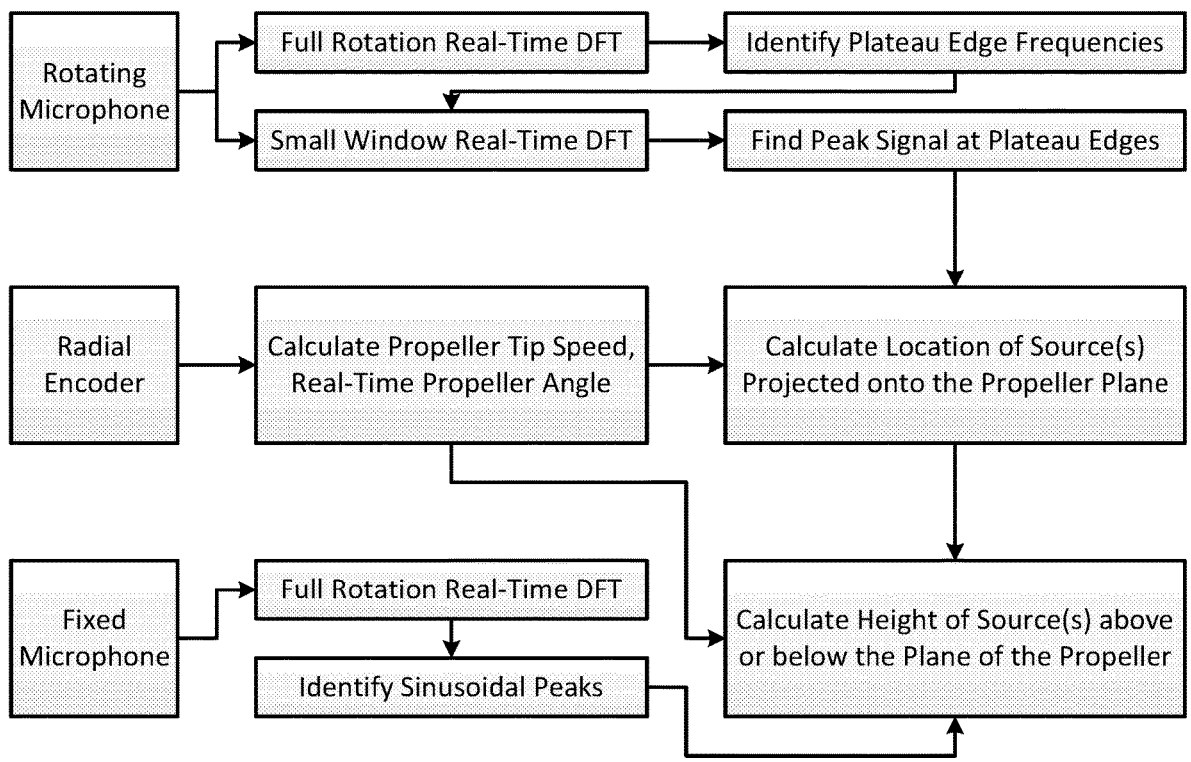
FIG. 12B is a flowchart depicting data collection and processing according to one embodiment of the present invention.

Signal processing would be required to subtract background noise and identify each peak frequency experiencing a paired Doppler shift. FIG. 12A depicts one strategy used by an embodiment of the invention. In one embodiment, the acoustic data and angle information from the propeller unit 200 could be synchronously recorded. Two separate Fourier transform calculations would occur in parallel. A discrete Fourier transform of the acoustic signal from the first tip microphone 202 and a discrete Fourier transform of the acoustic signal from the static microphone 102 for at least one full rotation of the propeller unit 200 is applied. Frequency peaks from the static microphone 102 source which also show up as frequency plateaus from the first tip microphone 202 are identified as sources to be tracked. FIG. 11. A short sample window discrete Fourier transfer for just the frequencies identified will be continuously calculated in real time as the propeller unit 200 rotates. The angles associated with the peak signals for these frequencies will then be used to calculated the location of the acoustic source projected onto the plane of the first member 201 rotation. The height of the source h above or below the plane of the rotation will be determined by equations 1-4 above. FIG. 12B is a flowchart depicting this process according to one embodiment of the present invention.

Figure 13:
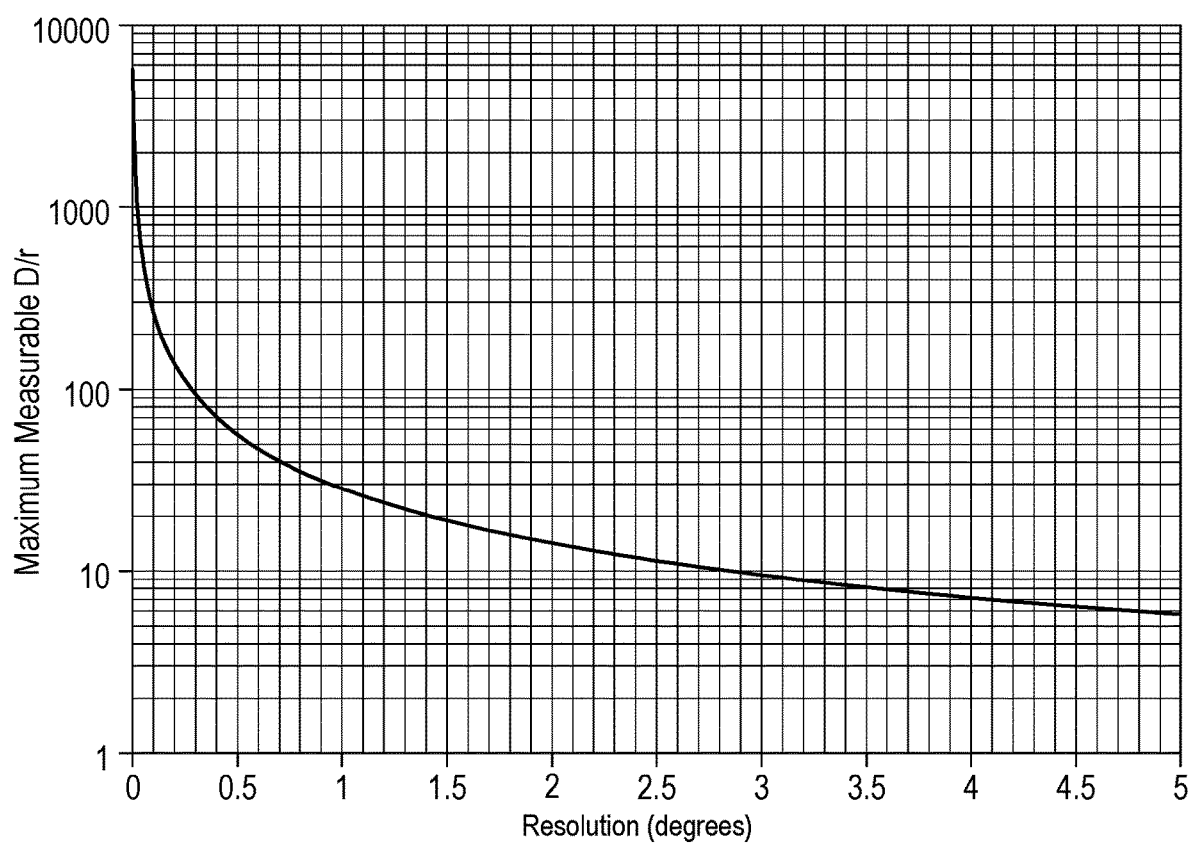
FIG. 13 is a plot depicting the maximum measurable distance to radius ratio versus the resolution in degrees according to one embodiment of the present invention.

The accuracy of the location of the acoustic source projected onto the plane of rotation of the propeller unit 200 is dependent on the ability to measure the angle of the propeller θ at the points of maximum (both negative and positive) Doppler shift. This measurement is dependent on the rotary encoder 103 resolution, the data sampling rate, and the rate of rotation of the variable high speed motor 104. Additionally, the resolution of the rotating small window fast Fourier transform centered at each data sample point will affect the measurement. Based on trigonometry, the relationship between the resolution of the measurement of the first member 201 position and the largest discernable distance form the first member 201 center to the acoustic source, projected onto the plane of the propeller, is depicted in FIG. 13 as a maximum measurable distance to radius ratio (of the firsts propeller 201) versus the resolution of the encoder in degrees. FIG. 13 depicts a maximum distance to radius ratio that can be discerned for a given resolution in being able to determine the angle of the first member 201 at maximum Doppler shift points. For sources beyond this distance, the system can only give a direction with the accuracy of the angle resolution.

Figure 14:
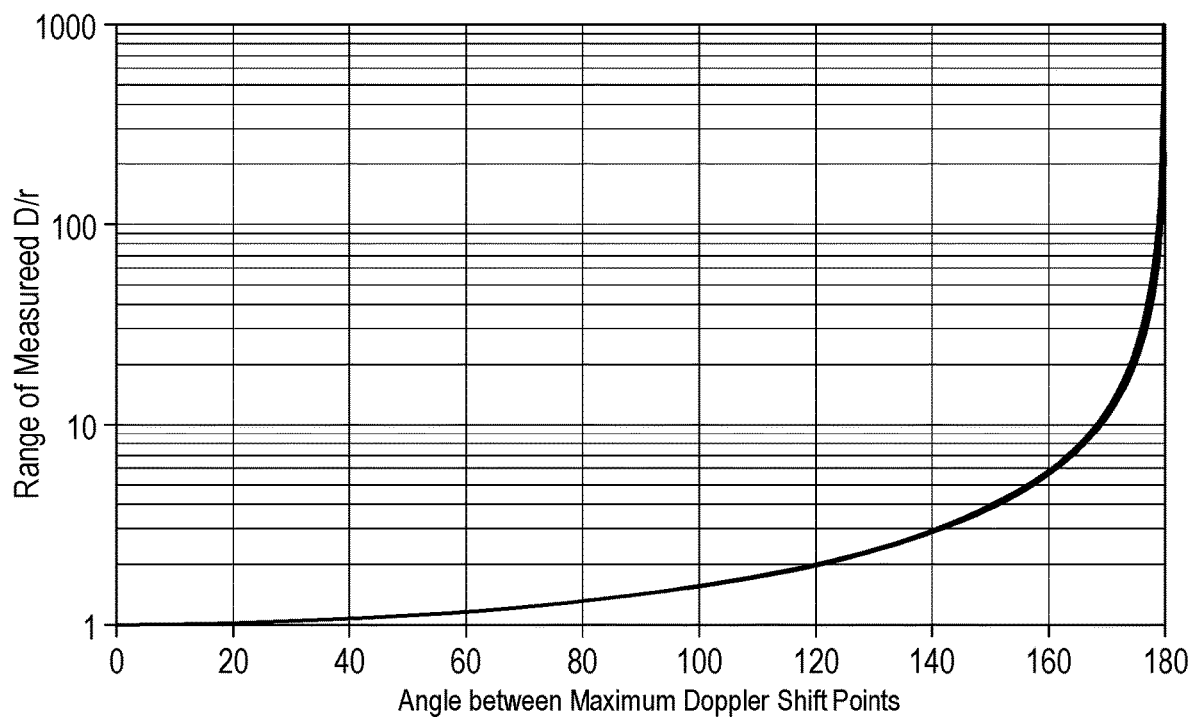
FIG. 14 is a plot depicting the range of measured distance to radius ratios versus the angle between maximum Doppler shift points according to one embodiment of the present invention.

FIG. 14 depicts the distance from the acoustic source to the center of the first member 201 for a measured angle between maximum Doppler shift points for an angle resolution of ⅛ of a degree. The vertical thickness of the line represents the range of distance to radius ratios the system can discern for this angle resolution.

Figure 15:
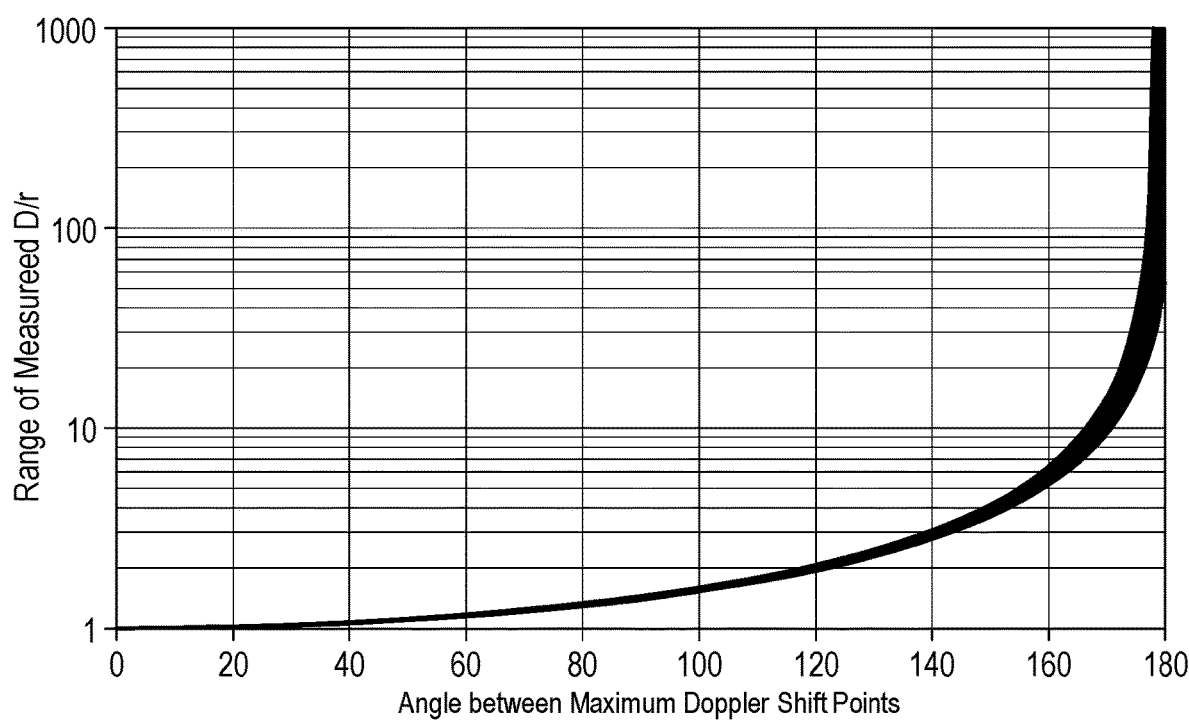
FIG. 15 is a plot depicting the range of measured distance to radius ratios versus the angle between maximum Doppler shift points according to one embodiment of the present invention.

FIG. 15 depicts the distance from the acoustic source to the center of the first member 201 for a measured angle between maximum Doppler shift points for an angle resolution of 1 degree. The vertical thickness of the line represents the range of distance to radius ratios the system can discern for this angle resolution.

Figure 16:
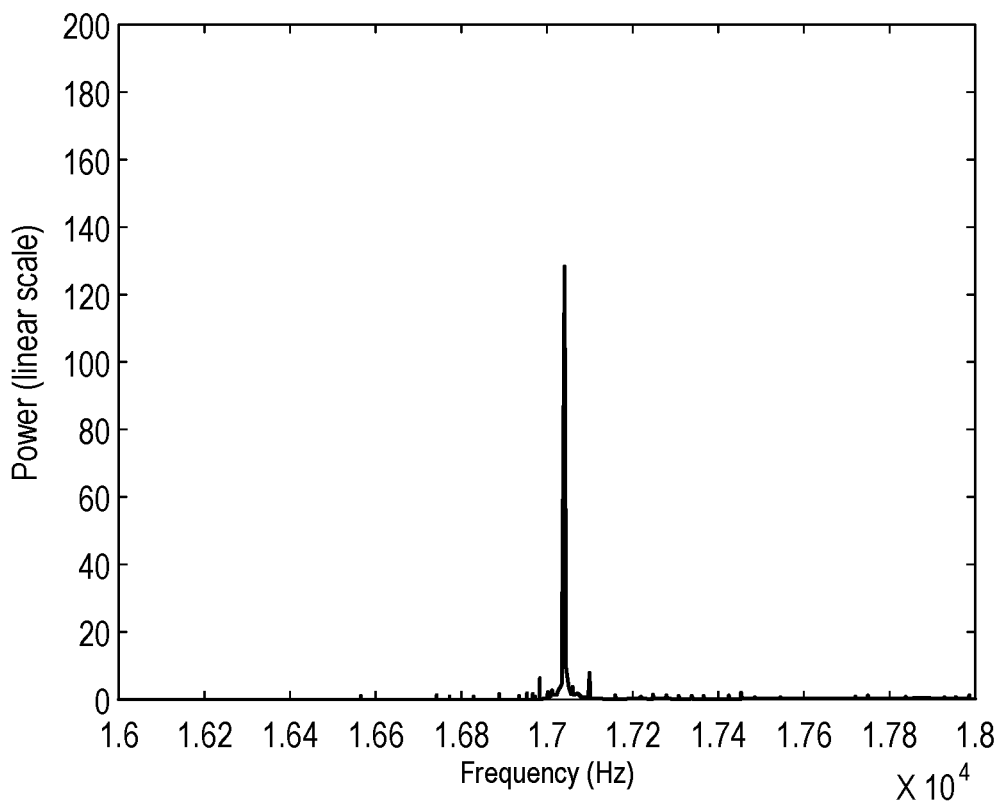
FIG. 16 is a plot depicting the acoustic spectrum for a stationary microphone according to one embodiment of the present invention.
Figure 17:
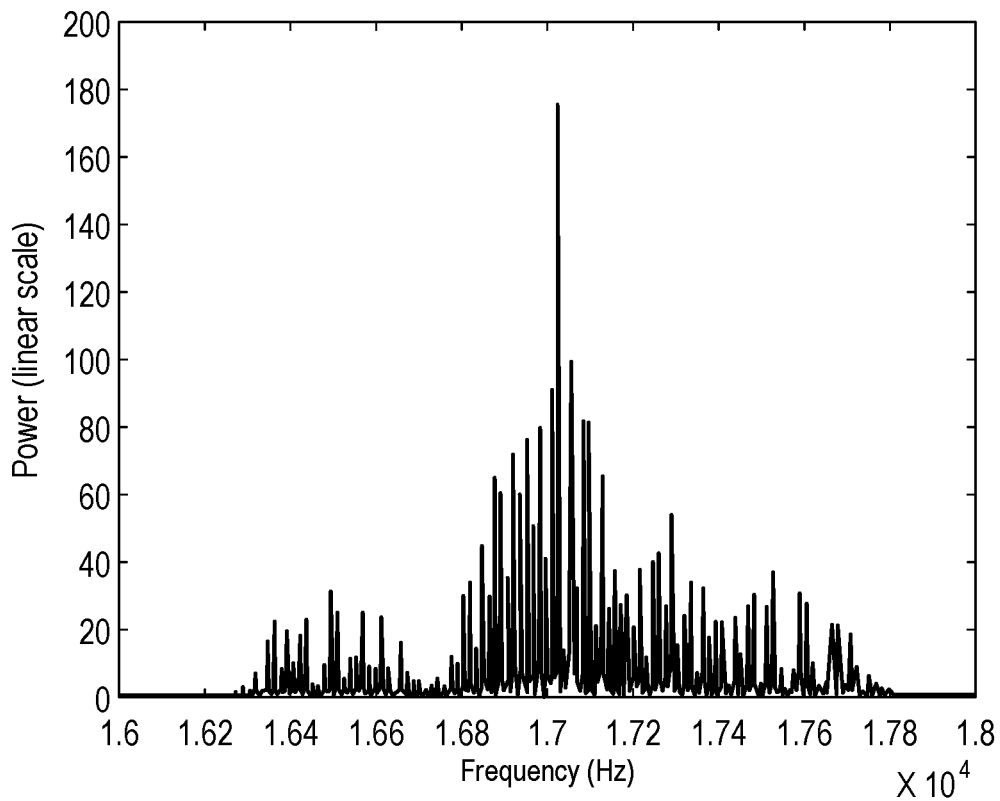
FIG. 17 is a plot depicting the acoustic spectrum for a rotating microphone according to one embodiment of the present invention.

In one embodiment, data was analyzed using both a MATLAB program and Microsoft Excel fast Fourier transforms. The Excel fast Fourier transforms were limited to a 4,096-point window and had to be individually executed for each calculation. FIG. 16 shows the acoustic spectrum for the static microphone 102 after 12 rotations after a long fast Fourier transform for a single acoustic source emitting at 17 kHz. In FIG. 17, the first member 201 is rotating at 15 rotations per second. FIG. 16 is calculated using MATLAB fast Fourier transform functions. FIG. 17 shows the long fast Fourier transform for the rotating first tip microphone 202 where the acoustic source is emitting at 17 kHz and the first member 201 is rotating at 15 rotations per second.

Figure 18:
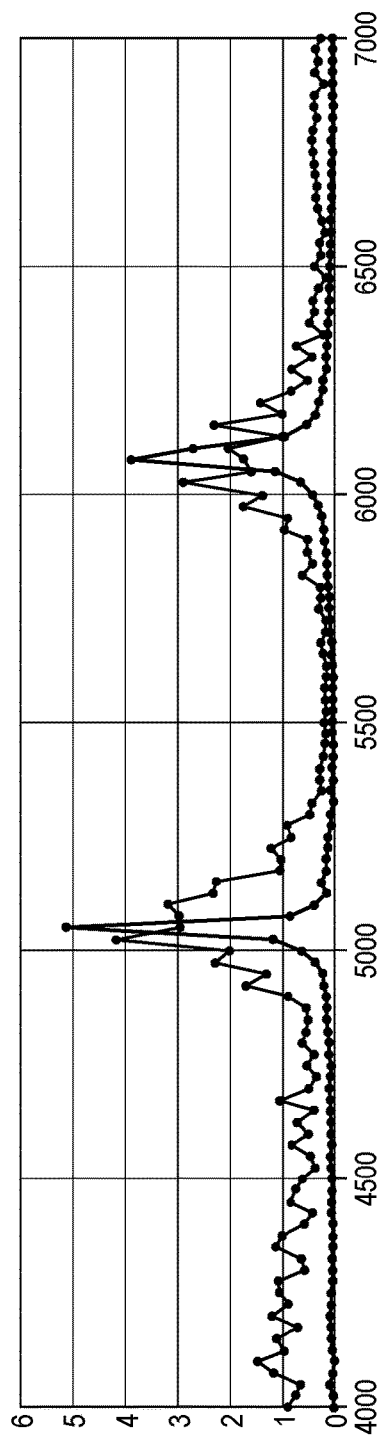
FIG. 18 is a plot depicting the acoustic spectrum for a stationary microphone and a rotating microphone according to one embodiment of the present invention.

FIG. 18 shows the long fast Fourier transforms in an embodiment where there are two separate acoustic sources at two distinct locations emitting at different frequencies. FIG. 18 depicts the fast Fourier transforms calculated in Microsoft Excel for inputs from both the static microphone 102 and the first tip microphone 202. In both scenarios (the single acoustic source of FIG. 16 and FIG. 17 as well as the multiple acoustic sources of FIG. 18), the measured frequencies of the spinning microphone show the chirped frequency plateau that the receiver Doppler shift causes. By noting the frequencies at the edges of such a frequency plateau, determining the propeller angle at the maximum Doppler shift is simplified.

Figure 19:
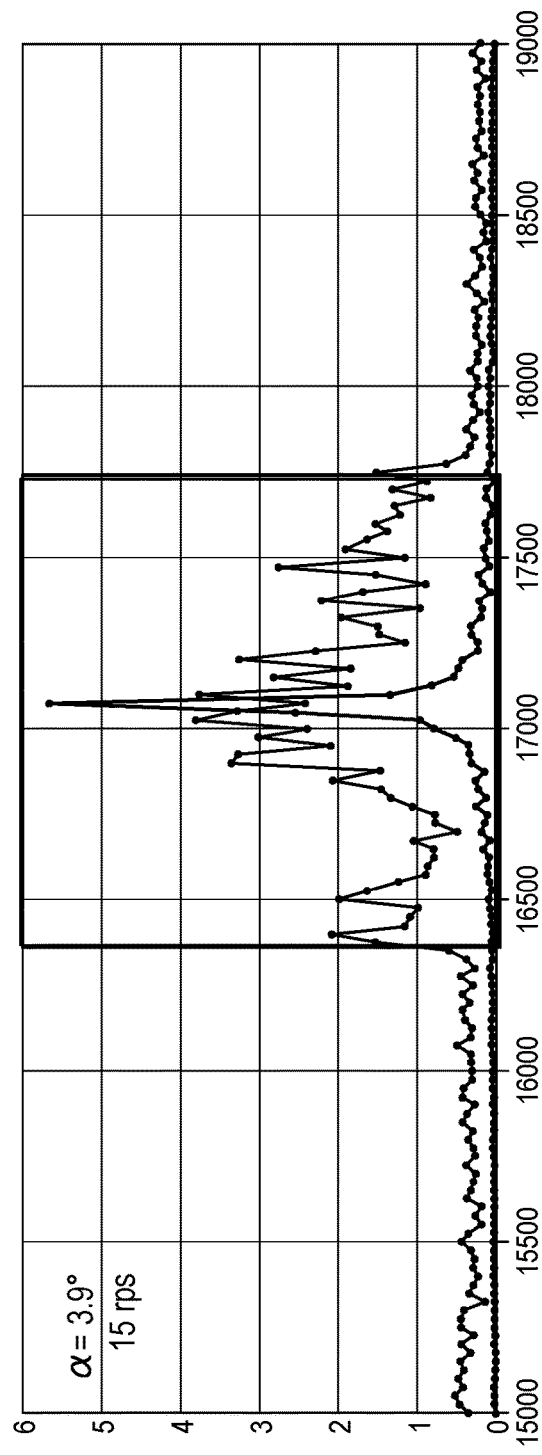
FIG. 19 is a plot depicting the acoustic spectrum for a stationary microphone and a rotating microphone for a source 3.9 degrees out of the plane of rotation according to one embodiment of the present invention.
Figure 20:
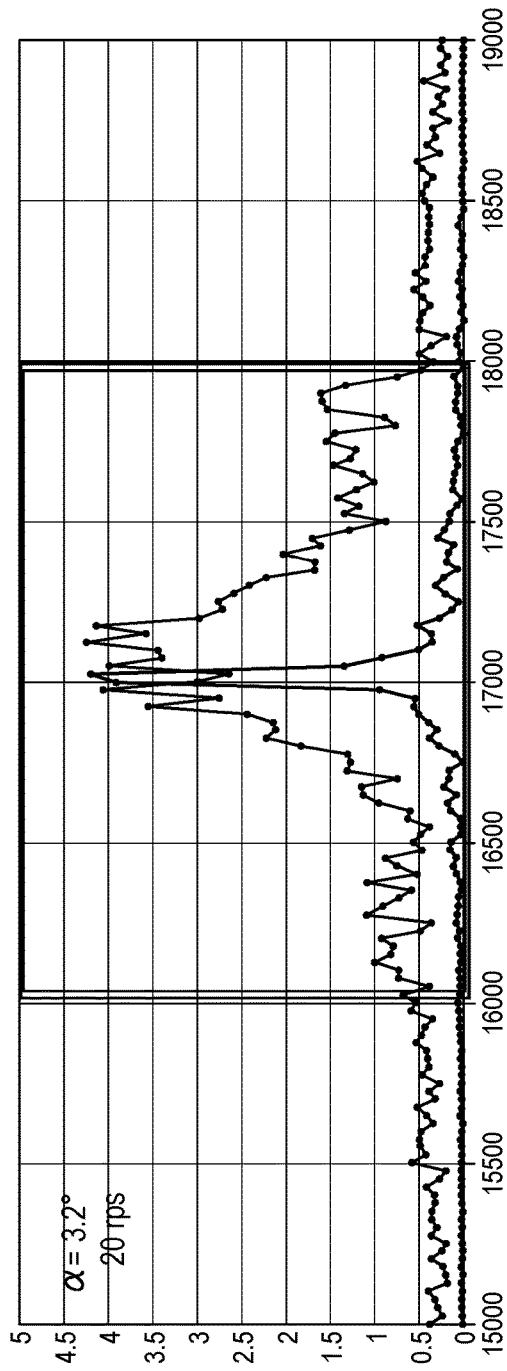
FIG. 20 is a plot depicting the acoustic spectrum for a stationary microphone and a rotating microphone for a source 3.2 degrees out of the plane of rotation according to one embodiment of the present invention.
Figure 21:
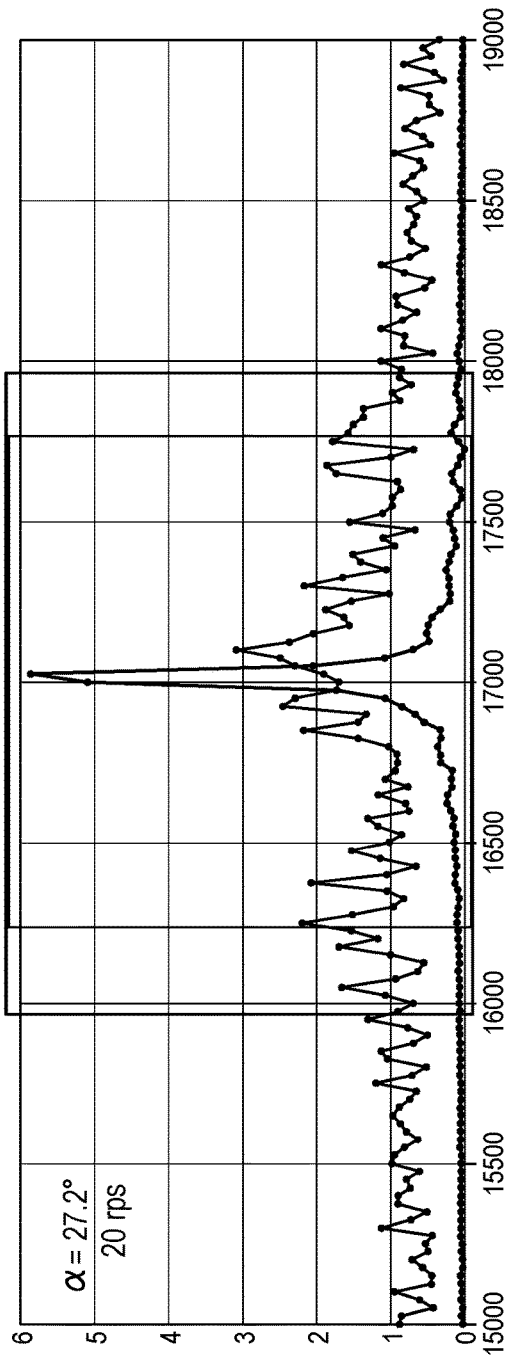
FIG. 21 is a plot depicting the acoustic spectrum for a stationary microphone and a rotating microphone for a source 27.2 degrees out of the plane of rotation according to one embodiment of the present invention.

The distance between the maximum positive Doppler shift peak and the static microphone's 102 peak signal is the same as the difference between the maximum negative Doppler shift peak and the static microphone's 102 peak signal if the source's relative velocity is negligible compared to the speed of the first tip microphone 202. The full Doppler shift equation for when the source and the center of the first member 201 are moving at speeds close to or higher than the propeller tip speed is given by equation 5 below:

$$f_m = f_0 + \Delta f_m = f_0 \frac{v_{sound} + n \cdot (\overrightarrow{v_{tip}} + \overrightarrow{v_{center}})}{c + n \cdot \overrightarrow{v_{source}}}, \tag{5}$$

wherein $\overrightarrow{v_{tip}}$ is the velocity vector at the first tip microphone 202, $\overrightarrow{v_{center}}$ is the velocity vector at the center of the first member 201, and $\overrightarrow{v_{source}}$ is the velocity vector of the acoustic source. Where $\overrightarrow{v_{center}}$ and $\overrightarrow{v_{source}}$ are negligible, equation 5 simplifies into equation 6 below:

$$f_m = f_0 + \Delta f_m = f_0 + f_0 \frac{n \cdot \overrightarrow{v_{tip}}}{c}. \tag{6}$$

Where n is in the same direction as $\overrightarrow{v_{tip}}$, equation 6 may be expressed as equation 7 below:

$$\Delta f_m = \Delta f_{max} = f_0 \frac{\pi l r}{c}, \tag{7}$$

wherein r is the spin rate of the first member 201. Equation 7 can only occur when the acoustic source is in the same plane as the rotating first member 201. FIG. 19 and FIG. 20 show the Doppler shifts for data sets where the source is within four degrees of the plane of the spinning propeller, while FIG. 21 shows the Doppler shifts for a source 27 degrees out of the plane of the spinning propeller. The boxes in FIG. 19, FIG. 20, and FIG. 21 show both the maximum possible Doppler shift for the source and the measured Doppler shift for the source. In the case of the data set used in FIG. 21, the angle α of the source off the plane of the first member 201 was calculated using equation 8 below:

$$\alpha = \pm \tan^{-1} \sqrt{\frac{\Delta f_{max}}{\Delta f_m} - 1} = \pm \tan^{-1} \sqrt{\frac{938 \text{ Hz}}{756 \text{ Hz}} - 1} \cong \pm 28°, \tag{8}$$

assuming the speed of sound c was 343 meters per second. This compares favorably with the actual α of −27.2° based on the measured coordinates. FIG. 8 depicts a visual representation of the relationship between α, A, and h from one embodiment of the present invention. The ability to accurately measure h is contingent upon accurately determining the edges of the Doppler shift chirp plateau.

Figure 22:
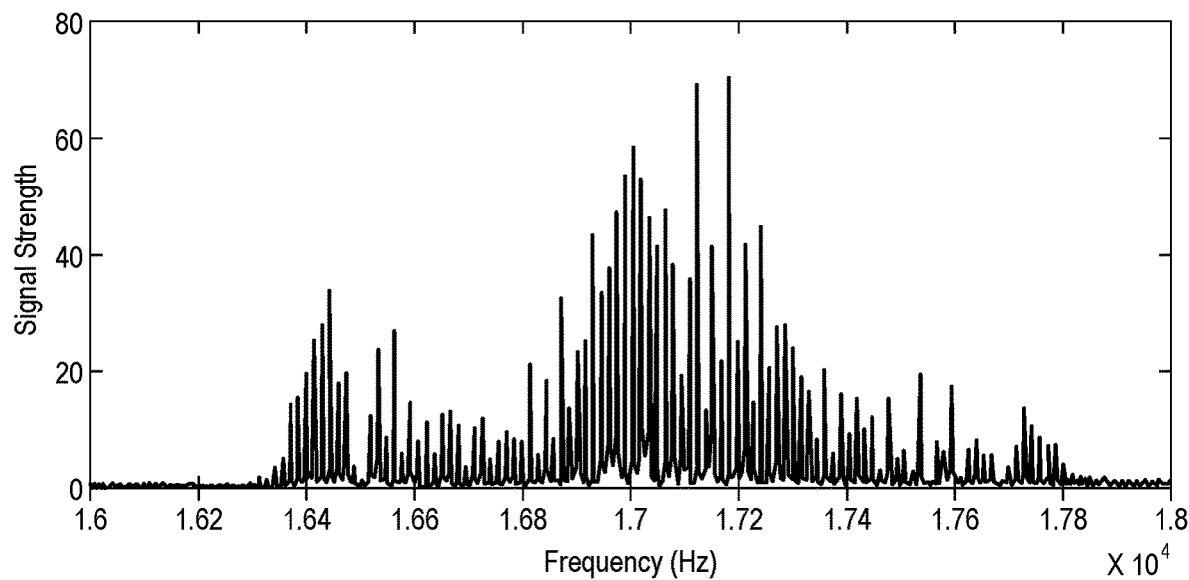
FIG. 22 is a plot depicting long fast Fourier transforms of a rotating microphone for a source near in-plane.
Figure 23:
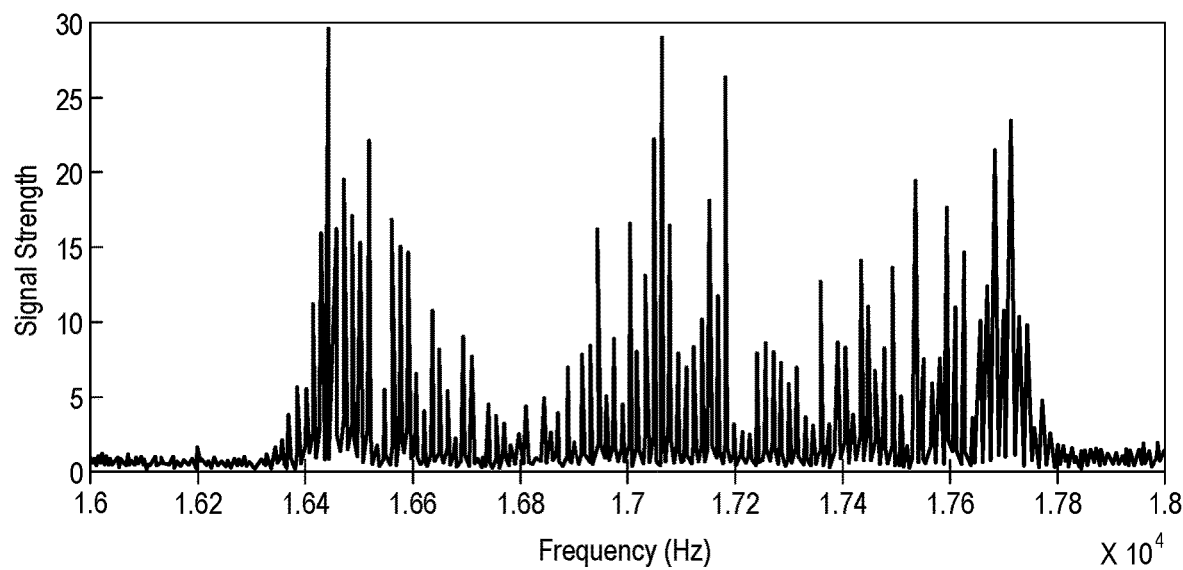
FIG. 23 is a plot depicting long fast Fourier transforms of a rotating microphone for a source below the spin plane.

FIG. 22 and FIG. 23 show MATLAB fast Fourier transforms for multiple rotations for identical 17 kHz sources in an embodiment where the first member 201 is rotating at 15 rotations per second. FIG. 22 depicts a scenario where the acoustic source is near in-plane relative to the rotating first member 201 (1° out of plane), while FIG. 23 shows a scenario where the acoustic source is 23.83° below the spin plane of the first member 201. From FIG. 22 and FIG. 23, it is apparent that MATLAB fast Fourier transforms can take a much greater sample window than the Microsoft Excel fast Fourier transforms, making the edges of the plateau easier to discern.

Figure 24A:
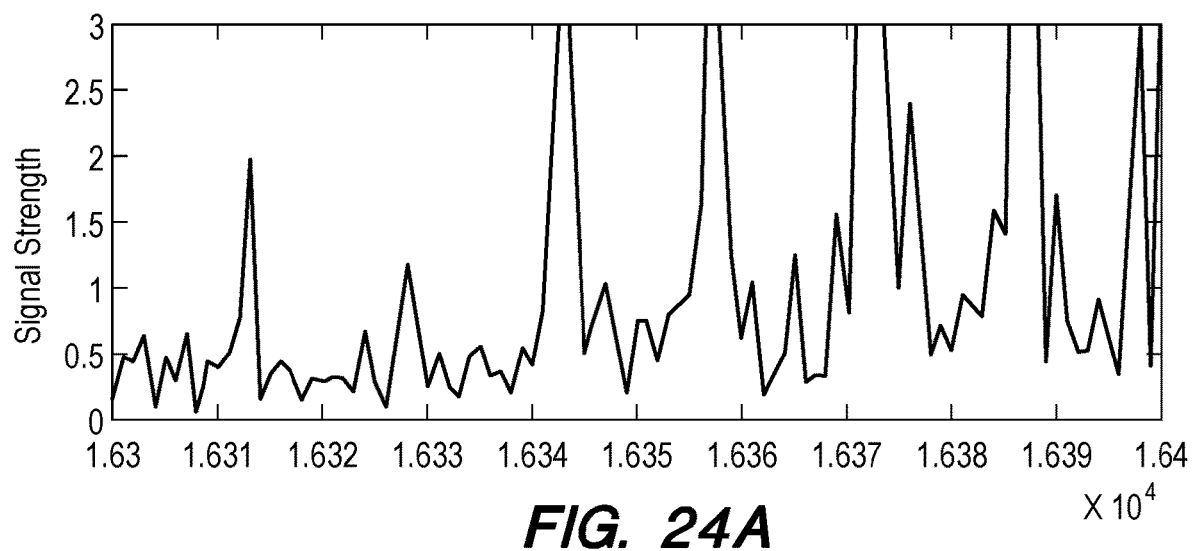
FIGS. 24A and 24B depict long fast Fourier transforms of a rotating microphone for a source near in-plane.
Figure 24B:
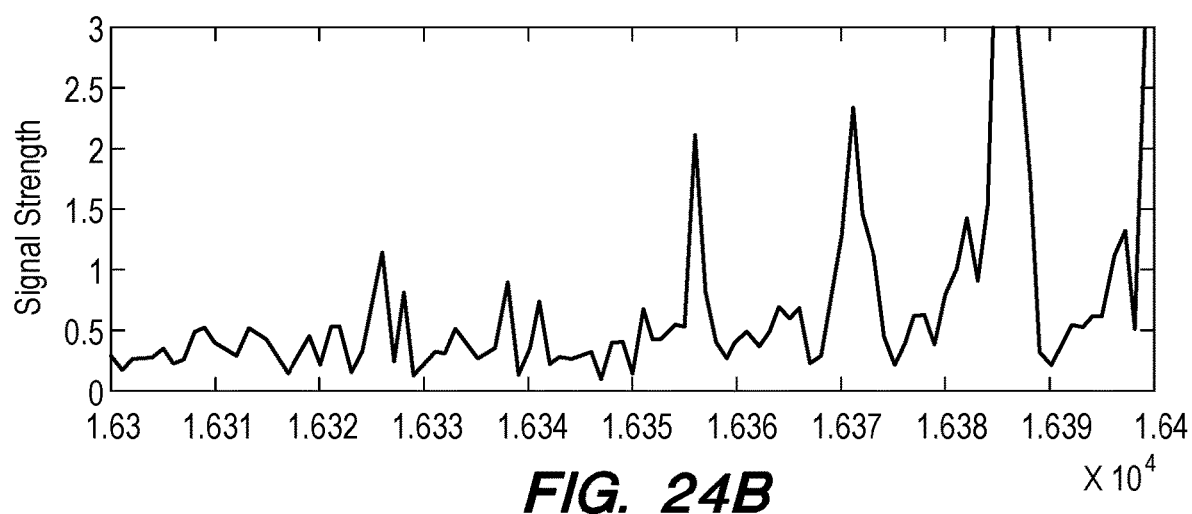
Figure 24C:
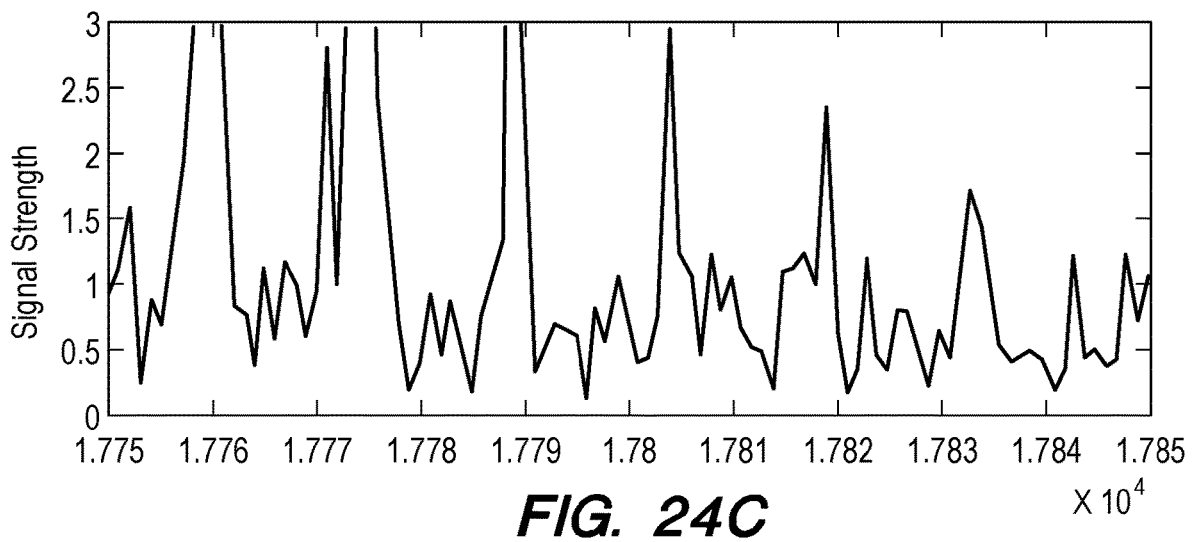
FIGS. 24C and 24D depict long fast Fourier transforms of a rotating microphone for a source below the spin plane.
Figure 24D:
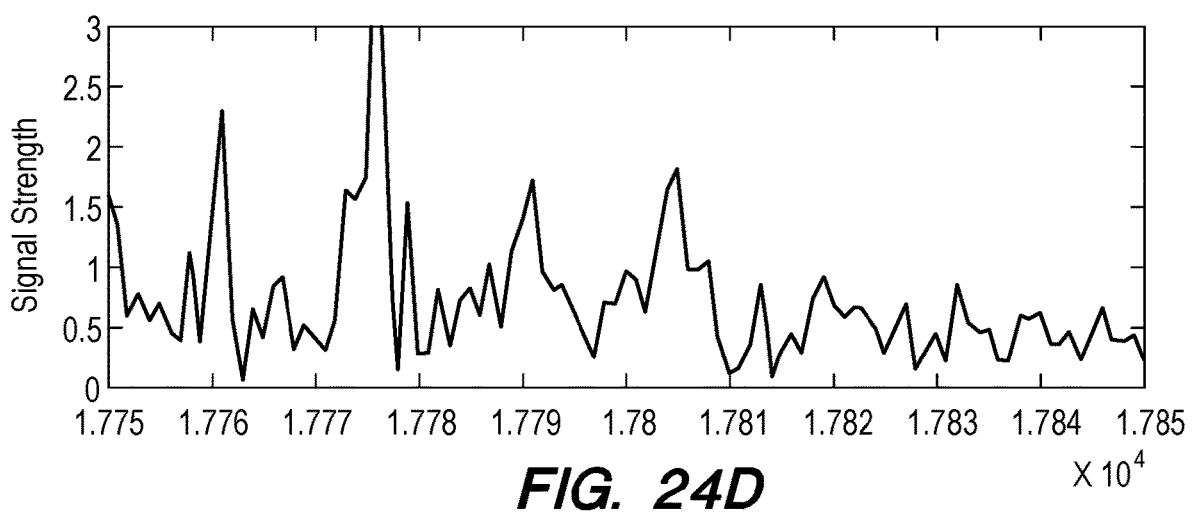
Figure 25:
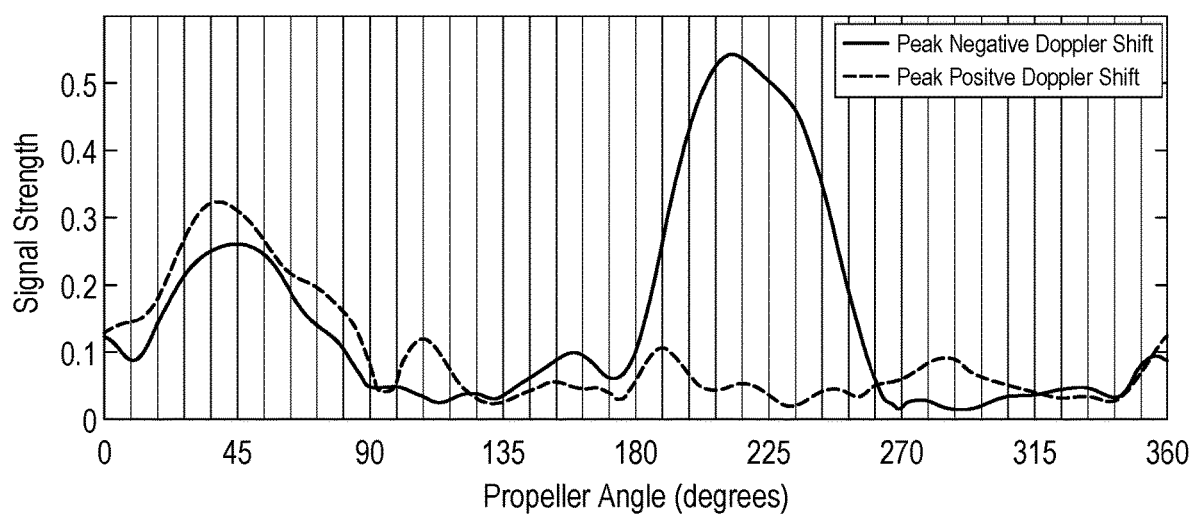
FIG. 25 depicts the radial frequency response for peak Doppler shift frequencies.

FIG. 24A, FIG. 24B, FIG. 24C, and FIG. 24D depict a consistent means of defining the edges of the Doppler shift plateau by establishing an arbitrary signal strength threshold. FIG. 24A and FIG. 24B show that the plateau edges are determined to be 16.343 kHz (FIG. 24A) and 17.789 kHz (FIG. 24B) for the acoustic source within 1° in plane. FIG. 24C and FIG. 24D show that the plateau edges are determined to be 16.385 kHz (FIG. 24C) and 17.7767 kHz (FIG. 24D) for the acoustic source 23.83° out of plane. These edge frequencies can then be used to calculate both the angle out of the spin plane and the propeller angle of rotation θ at which the maximum positive and negative shifts occur. This is depicted in FIG. 25.

In an embodiment where the fast Fourier transform calculation has a 50 Hz resolution, the determined distance in the plane of rotation is within 3% accurate (2.965 meters instead of 3.048 meters) while the angle out of the plane calculation is with 37.5% accurate (14.9° instead of 23.8°). The frequency resolution may be improved by increasing the rotating fast Fourier transform sample size using data from multiple rotations of the propeller unit 200. FIG. 25 shows signal strength as a function of propeller angle for the frequencies of measured peak negative Doppler shift and measured peak positive Doppler shift. From FIG. 25, it is apparent that the peak signals at 38.3° and 212.5° have an angle between them of 174.2°. The expected angle (based on distance measurements) is 174.4°. These are the angles with correspond with the calculated distance of 2.965 meters and the actual distance of 3.048 meters (and 3% accuracy).

The present invention provides a low cost lightweight tracking system with a small physical footprint that allows individual unmanned aerial vehicles to track the location of neighboring unmanned aerial vehicles. With sufficient data processing, the system could track multiple drones with the same acoustic signature, as well as drones positioned behind other drones. Signals can be process with either a digital or analog system. The present invention could work with a single microphone one blade tip that collects acoustic versus rotational angle data over its complete rotation. A separate microphone not mounted on a propeller could be used to subtract background acoustic signals not experiencing a Doppler shift. If the angular orientation of the unmanned aerial vehicle is measured and reordered, a single propeller mounted microphone could provide the same information as multiple microphones on multiple propellers mounted at different angles. The larger the diameter of the propeller, the greater the accuracy of the calculated acoustic source position will be. A fixed acoustic sinusoidal source could provide a beacon for exact global positioning in the absence of a GPS satellite signal. Additionally, recording the angle of the propeller may not be necessary if a fixed acoustic source on the unmanned aerial vehicle itself is used as a reference for the direction of the unknown sources.

What is claimed is:

1. A method for determining a location of a first source comprising:

providing a first member, wherein a first tip microphone is attached to a first end of said first member;
recording an initial frequency;
rotating the first member at an angular velocity;
calculating a tangential distance from the first tip microphone to the source;
calculating a source angle from the first member to the source; and
calculating a height of the source.

2. The method of claim 1, further comprising the step of calculating a first tip velocity $v_1$ according to the relationship $$v_1 = \frac{\omega l}{2},$$

wherein l is a length of the first member and ω is the angular velocity.

3. The method of claim 1, further comprising the step of recording for each angle of rotation θ a measured frequency $f_m$.

4. The method of claim 1, further comprising the step of determining a maximum measured frequency $f_{max}$ and a corresponding maximum angle $\theta_{max}$.

5. The method of claim 1, further comprising the step of determining a minimum measured frequency $f_{min}$ and a corresponding minimum angle $\theta_{min}$.

6. The method of claim 2, further comprising the step of calculating a maximum possible Doppler shift frequency $\Delta f_{max}$ according to the relationship $$\Delta f_{max} = f_0 \frac{v_1}{c},$$

wherein c is a speed of sound, and wherein $f_0$ is the initial frequency.

7. The method of claim 6, further comprising the step of determining a calculated frequency $f_{measured}$ according to the relationship $$\Delta f_{measured} = f_0 \frac{n \cdot \vec{v_1}}{c}$$

and the relationship $f_{measured} = \Delta f_{measured} + f_0$, wherein n is a unit vector in the direction from the source to the first tip microphone, and $\vec{v_1}$ is a velocity vector of the first tip microphone.

8. The method of claim 7, wherein the height of the source h is calculated according to the relationship $$h = \pm A \sqrt{\left(\frac{\Delta f_{max}}{\Delta f_{measured}}\right)^2 - 1},$$

wherein A is the tangential distance.

9. The method of claim 1, further comprising the step of providing a second member with a second tip microphone attached to a second end of said second member.

10. The method of claim 9, further comprising the step of orienting the second member at an angle different from the first member.

11. The method of claim 10, further comprising the step of calculating a second height $h_2$ of the source.

12. The method of claim 11, further comprising the step of comparing the height of the source h with $h_2$ to determine whether h is above or below the first member.

13. A method for determining a location of a source comprising:
provoiding a first member of length l, wherein a first tip microphone is attached to a first end of said first member;
providing a static microphone;
recording at the static microphone an initial frequency $f_0$;
rotating the first member at an angular velocity $\omega$;
calculating a first tip velocity $v_1$ according to the relationship $$v_1 = \frac{\omega l}{2};$$

recording for each angle of rotation $\theta$ a measured frequency $f_m$;
determining a maximum measured frequency $f_{max}$ and a corresponding maximum angle $\theta_{max}$;
determining a minimum measured frequency $f_{min}$ and a corresponding minimum angle $\theta_{min}$;
calculating a tangential distance A and source angle $\alpha$;
calculating a maximum possible Doppler shift frequency $\Delta f_{max}$ according to the relationship $$h = \pm A \sqrt{\left(\frac{\Delta f_{max}}{\Delta f_{measured}}\right)^2 - 1},$$

and the relationship $f_{measured} = \Delta f_{measured} + f_0$, wherein c is a speed of sound;
determining a calculated frequency $f_{measured}$ according to the relationship $$\Delta f_{max} = f_0 \frac{v_1}{c}$$

wherein n is a unit vector in the direction from the source to the first tip microphone, and $\vec{v_1}$ is a velocity vector of the first tip microphone; and
calculating a height of the source h according to the relationship $$\Delta f_{measured} = f_0 \frac{n \cdot \vec{v_1}}{c},$$

wherein A is the tangential distance.

14. The method of claim 13, further comprising the step of providing a second member with a second tip microphone attached to a second end of said second member.

15. The method of claim 14, further comprising the step of orienting the second member at an angle different from the first member.

16. The method of claim 15, further comprising the step of calculating a second height $h_2$ of the source.

17. The method of claim 16, further comprising the step of comparing h and $h_2$ to determine whether h is above or below the first member.

18. A method for determining a location of a source comprising:
providing a first member of length l, wherein a first tip microphone is attached to a first end of said first member;
providing a static microphone;
providing a rotary encoder;
measuring at the radial encoder an angle of rotation $\theta$;
recording at the static microphone an initial frequency $f_0$;
rotating the first member at an angular velocity $\omega$;
calculating a first tip velocity $v_1$ according to the relationship $$v_1 = \frac{\omega l}{2};$$

recording for each angle of rotation $\theta$ a measured frequency $f_m$;
determining a maximum measured frequency $f_{max}$ and a corresponding maximum angle $\theta_{max}$;
determining a minimum measured frequency $f_{min}$ and a corresponding minimum angle $\theta_{min}$;
calculating a tangential distance A and source angle $\alpha$;
calculating a maximum possible Doppler shift frequency $\Delta f_{max}$ according to the relationship $$\Delta f_{max} = f_0 \frac{v_1}{c},$$

wherein c is a speed of sound;
determining a calculated frequency $f_{measured}$ according to the relationship $$\Delta f_{measured} = f_0 \frac{n \cdot \vec{v_1}}{c}$$

and the relationship $f_{measured} = \Delta f_{measured} + f_0$, wherein n is a unit vector in the direction from the source to the first tip microphone, and $\vec{v_1}$ is a velocity vector of the first tip microphone;
calculating a height of the source h according to the relationship $$h = \pm A \sqrt{\left(\frac{\Delta f_{max}}{\Delta f_{measured}}\right)^2 - 1},$$

wherein A is the tangential distance;
providing a second member with a second tip microphone attached to a second end of said second member;
orienting the second member at an angle different from the first member;
calculating a second height $h_2$ of the source;
comparing h and $h_2$ to determine whether h is above or below the first member; and
wherein the initial frequency $f_0$, measured frequency $f_m$, and angle of rotation $\theta$ are synchronously recorded.

19. The method of claim 18, further comprising the steps of applying a full rotational discrete Fourier transform to the measured frequency $f_m$, identifying plateau edge frequencies, applying a small window discrete Fourier transform to the measured frequency $f_m$, and identifying a peak signal at plateau edges.

20. The method of claim 18, further comprising the steps of applying a full rotation discrete Fourier transform to the initial frequency $f_0$, and identifying sinusoidal peaks.

* * * * *